(12) United States Patent
Siegel et al.

(10) Patent No.: US 9,419,800 B2
(45) Date of Patent: Aug. 16, 2016

(54) SECURE NETWORK SYSTEMS AND METHODS

(75) Inventors: Neil G. Siegel, Rolling Hills Estates, CA (US); Daniel Jacques, Clarksville, MD (US); William E. Freeman, Sykesville, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 960 days.

(21) Appl. No.: 13/588,653

(22) Filed: Aug. 17, 2012

(65) Prior Publication Data
US 2014/0052980 A1 Feb. 20, 2014

(51) Int. Cl.
*H04L 9/00* (2006.01)
*H04L 9/32* (2006.01)
*G06F 9/455* (2006.01)
*H04L 29/06* (2006.01)

(52) U.S. Cl.
CPC .......... *H04L 9/3234* (2013.01); *G06F 9/45558* (2013.01); *H04L 63/0272* (2013.01); *H04L 63/0236* (2013.01); *H04L 63/0471* (2013.01)

(58) Field of Classification Search
USPC ......................................................... 713/153
See application file for complete search history.

(56) References Cited

U.S. PATENT DOCUMENTS

2008/0301433 A1* 12/2008 Vito ............................. 713/153

* cited by examiner

*Primary Examiner* — Tu Nguyen
(74) *Attorney, Agent, or Firm* — Tarolli, Sundheim, Covell & Tummino LLP

(57) ABSTRACT

Secure network systems and methods are provided. In an aspect of the invention, a secure network system is provided that includes a computing system that comprises a client system and a specialized NIC (network interface controller) system equipped with the capability to form a secure connection with an endpoint system and encrypt and decrypt communications between the client system and the network to which it is connected. This trusted network interface (TNI), which may present itself as a physical peripheral connected to a physical client system or a virtual peripheral connected to a virtual client system, takes the place of a client system's standard NIC, and the connection that it forms with the trusted network is negotiated and enforced externally to and independent of the client system.

23 Claims, 5 Drawing Sheets

SECURE NETWORK SYSTEMS AND METHODS

TECHNICAL FIELD

The present invention relates generally to communications, and specifically to secure network systems and methods.

BACKGROUND

In the field of networking, the area of network security consists of the provisions and policies adopted by a network administrator to prevent and monitor unauthorized access, misuse, modification, or denial of the computer network and network-accessible resources. Network security involves the authorization of access to data and services in a network. Network security covers a variety of computer networks, both public and private, that are used in everyday jobs conducting transactions and communications among businesses, government agencies and individuals. Networks can be private, such as a corporate network, or public, such as the Internet. In some cases, users may need to access private networks through public networks, such as a connecting to a VPN over the Internet. In many situations, increases in network security involve restricting either the software or capabilities of systems in a network to a trusted base, which can hinder the ability for users to perform their desired tasks. Furthermore, many networks do not have provisions for mitigating exfiltration (egress) of network information and/or an attribution mechanism to associate activities with the users who are performing them.

SUMMARY

In accordance with an aspect of the invention, a secure network system is provided. The secure network system utilizes a specialized NIC (network interface controller) system equipped with the capability to form a secure connection with an endpoint system and encrypt and decrypt communications between the client system and the network to which it is connected. This trusted network interface (TNI) system takes the place of a client system's standard NIC.

A TNI's session negotiation and cryptographic operation is independent from the client system, and is not subject to influence from the client system. A TNI may be provisioned with or have direct access to cryptographically-secure credentials used to form a secure connection with a trusted network and/or uniquely identify itself. These credentials may include a cryptographically-secure credential associated with the user of the client system and/or a cryptographically-secure credential associated with the TNI.

In accordance with another aspect of the invention, a secure network system comprises a computing system and a trusted network system. The computing system comprises a client system and a TNI that negotiates a session with the trusted network system on behalf of the client system. The trusted network system comprises a trusted network and a trusted network gateway (TNG) that establishes an encrypted communication session between the client system through the TNI and, upon success, allows the client system to access the trusted network.

In accordance with another aspect of the invention, a method of providing secure communication between a client system and a trusted network is provided. The method comprises receiving a user/TNI cryptographic authentication credential from a TNI that is coupled to the client system, wherein the user/TNI cryptographic authentication credential includes a key associated with a user of the client system and a key associated with the TNI. The method further comprises authenticating the user/TNI cryptographic authentication credential, providing the TNI with a unique session key to encrypt client communications, receiving and decrypting encrypted client communications from the client system's TNI, and providing the decrypted client communications to the trusted network.

DETAILED DESCRIPTION

Figure 1:
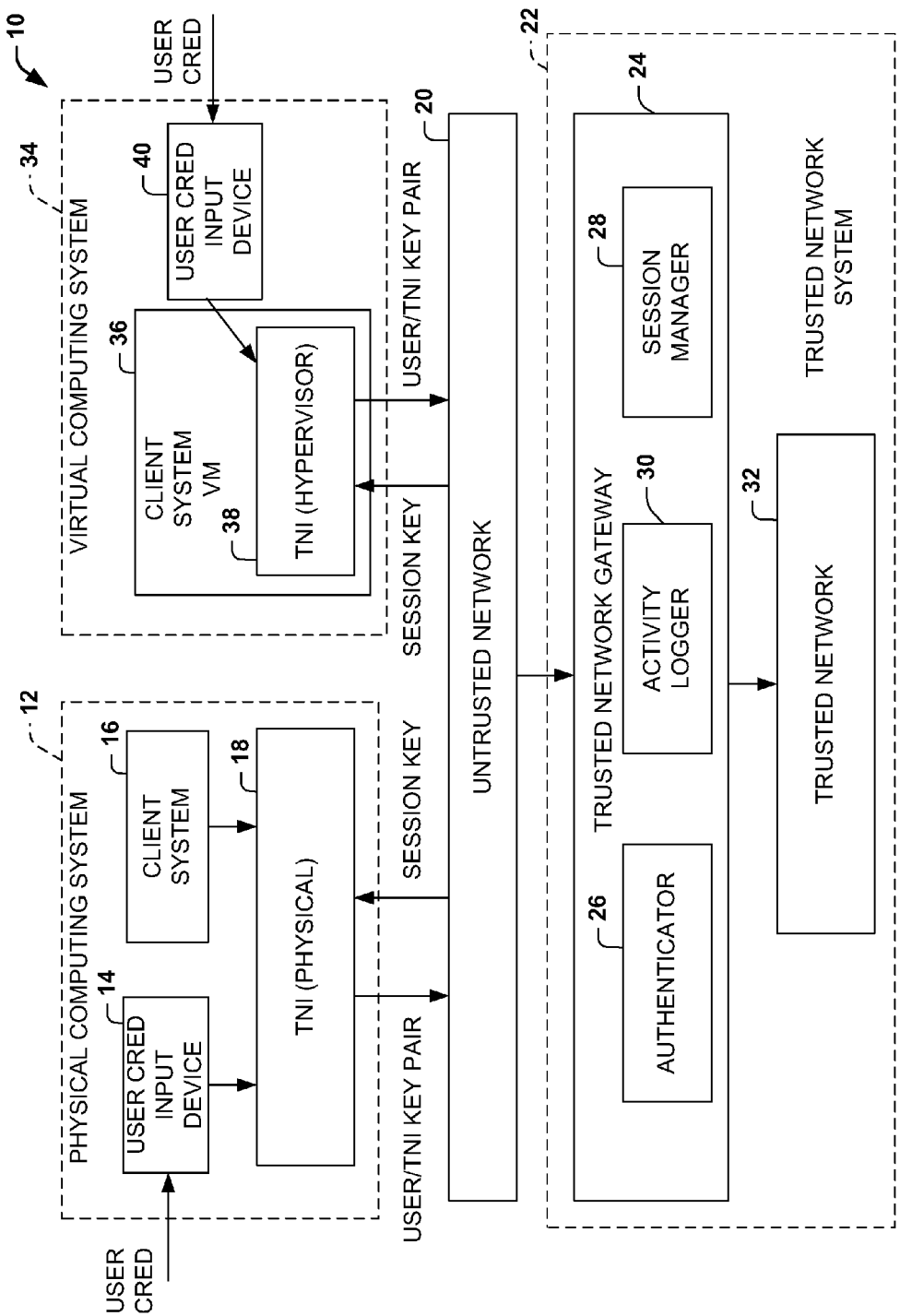
FIG. 1 illustrates a schematic block diagram of an example of a secure network system in accordance with an aspect of the present invention.

Secure network systems and methods are provided. In one aspect of the invention, a secure network system comprises a client computer that interfaces with a trusted network interface controller (TNI) that enforces mandatory encryption of all client communications. The TNI has an associated TNI cryptographically-secure credential. Depending on configuration, the TNI may also interface with a cryptographically-secure credential associated with a user (e.g., smart card that includes a user encryption key) to generate, for example, a cryptographically-secure credential pair representing the user/TNI pair. In this case, the user's credential is supplied through a hardware or software path directly connected with the TNI so that it cannot be accessed or manipulated by a user's client system. The cryptographically-secure credential pair is provided to a trusted network gateway (TNG) that negotiates and establishes an encrypted session with the TNI based on the TNI's cryptographically-secure credential pair. Upon successful negotiation, the TNG acts as a gateway between the TNI and a private secure system and/or trusted network coupled to the TNG. For example, a unique session cryptographically-secure credential may be generated and shared with a TNI to encrypt the session.

The TNI is a peripheral which interfaces with client system to which it is coupled through one of its peripheral interfaces. A TNI exposes itself to its client system as a NIC, and is utilized by the client in a manner consistent with other NICs. The TNI is responsible for negotiating a secure connection with the TNG and encrypting client communications; the client is not involved in this process. Therefore, all client network traffic, regardless of the client's intentions, will pass through the TNI and become encrypted. Traffic destined to the trusted network will arrive at the TNG, become decrypted, and enter that network. However, malicious traffic sent by the client to a third-party (which lacks the cryptographic credentials to form a secure connection with the TNI) will still become encrypted by the TNI and will therefore be unintelligible to the third-party. Similarly, any malicious traffic originating from a third-party cannot be successfully decrypted by the TNI, and thus if made available to the client, will be unintelligible. In the illustrated examples, the cryptographically-secure credentials are encryption/decryption keys. However, other cryptographically-secure credentials could be employed to carry out the present invention.

In an aspect of the invention, the TNI contains a cryptographic network stack that, when enabled, encrypts all client traffic transmitted through the TNI and decrypts all traffic received by the TNI. The TNI functions as a NIC peripheral, and can be implemented either as a hardware device that is physically connected to the client, or as a virtual software peripheral that is provisioned to a virtual client.

A secure network may be designed to include client systems whose only NIC peripherals are TNIs. This secure network would include systems connecting through a TNG via their TNI, the TNG, and internal systems behind the TNG. Client systems connecting through their TNI would be able to communicate only with other systems on the secure network.

The systems and methods provide a technique to allow untrusted systems to securely communicate over a public network. Furthermore, the TNG can cryptographically associate a session and that session's traffic with the specific user and system (via the TNI) from which it originated, such that the user's activity associated with the specific user and specific device can be monitored, logged, and/or referenced with a prosecutable accuracy. For example, prior to allowing a TNI to connect to the trusted network, the TNG authenticates both the user and TNI credentials used to negotiate the session with the TNG. The TNG can then associate all sessions with a user and a TNI. Requiring the user to provide a personal cryptographic authenticator allows a specific person to be associated with their activities, and requiring a TNI to provide its provisioned cryptographic authenticator allows a specific device to be associated with these activities. The TNG can perform extensive logging of sessions and data, associated with the user and TNI activities. Therefore, any malicious activity can be positively traced back to the specific user and system that caused it.

FIG. 1 illustrates an example of a secure network system 10 in accordance with an aspect of the present invention. The system 10 can include one or more physical TNI implementations 18 that can be configured to communicate with a trusted network 32 through an untrusted network 20 without exposing the communication to others coupled to the untrusted network 20. The system 10 can also include one or more virtual TNI implementations 38 that can be configured to communicate with the trusted network 32 through the untrusted network 20 without exposing the communication to others coupled to the untrusted network 20.

The physical computing system 12 includes a user credential input device 14 for receiving a user credential (e.g., smart card) that includes a user cryptographic authenticator and a client system 16 for performing user computing activities. The client system 16 can be, for example, a thin client that includes no local storage. The user credential input device 14 and the client system 16 are both coupled to a physical TNI 18 that has an associated cryptographically-secure credential (e.g., TNI encryption/decryption key). The TNI 18 also receives the user cryptographic authenticator and generates a user/TNI key pair. The user/TNI key pair is provided to a TNG 24 of a trusted network system 22 through the untrusted network 20 (e.g., Internet). An authenticator 26 of the TNG 24 authenticates both the user key and TNI key of the user/TNI key pair to prohibit unauthorized users and the users of unauthorized devices from accessing the trusted network 32 and its associated services of the trusted network system 22.

Once the authenticator 26 has authenticated the user key and TNI key of the user/TNI key pair, a session manager 28 component of the TNG 24 negotiates with the TNI 18 to form a unique session key for decrypting and encrypting of the session communications between the trusted network 32 and the client system 12. Therefore, all client communications will pass through the TNI 18 to the trusted network 32 through the TNG 24, such that only the TNG 24 can decrypt the traffic and all communication from the trusted network 32 will pass through the TNG 24 to the client system 16 through the TNI 18 such that only the TNI 18 can decrypt the traffic. Therefore, malicious data captured by a third-party that is sent by the client system 16 will be unintelligible to the third-party.

The TNG 24 includes an activity logger 30 that can perform extensive logging of session activities and can then associate all session activities with a specific user key and an associated TNI key. Therefore, malicious activities can be attributed to a user via the user key and attributed to a specific device via the TNI key, such that activities can be positively associated with the originating user and device.

The virtual computing system 34 includes a user credential input device 40 for receiving a user credential (e.g., smart card) that includes a user cryptographic authenticator and a client system 36 for performing user computing activities. The client system 36 can be, for example, a virtual machine (VM) that is conceptually equivalent to the client system 16. A virtual TNI (vTNI) 38, which is a software-implemented TNI supplied by the client system's hypervisor and presented to client system as a virtual hardware device, is connected to the client system VM 36 and performs the same function in software as the TNI 18 of the physical computing system 12 performs in hardware. The user credential input device 40 and the client system 36 are both coupled to the vTNI 38 by the hypervisor that has an associated vTNI cryptographically-secure credential (e.g., TNI encryption/decryption key). The vTNI 38 also receives a user encryption/decryption key and generates a user/TNI key pair. The user/TNI key pair is provided to the TNG 24 of the trusted network system 22 through the untrusted network 20. The authenticator 26 of the TNG 24 authenticates both the user key and vTNI key of the user/vTNI key pair to prohibit unauthorized users and the user of unauthorized devices from accessing the trusted network 32 and its associated services.

Once the authenticator 26 has authenticated the user key and vTNI key of the user/vTNI key pair, the session manager 28 of the TNG 24 generates and provides the vTNI 38 with a unique session key for decrypting and encrypting the session communications between the trusted network 32 and the client VM 36. The activity logger 30 can perform extensive logging of session activities and can then associate all session activities with a specific user and an associated vTNI.

It is to be appreciated that the physical TNI of the present invention provides a separate execution environment for authentication and encryption from the general-purpose computer, and that the virtual TNI of the present invention provides a separate execution environment for authentication and encryption from the client's virtual general-purpose computer, such that any TNI implementation establishes a cryptographic channel with the TNG independent from the client machine (physical or virtual) that is using the TNI. The TNI, as the client's only network device, prevents any client communication outside of this mutually-authenticated cryptographic channel. The cryptographic channel requires individual TNI and TNG authentication. If a user authentication device (e.g. smartcard) is present, the TNI interfaces directly with it, preventing hostile code on the client computer from accessing or manipulating the user credentials. As the only point of connection between the client system and the network that it is connected to, the TNI is able to forcefully-encrypt all network traffic sent by the client system and forcefully-decrypt all network traffic received by the client system. This prevents the client system from communicating with unapproved networks, including malicious networks, even if it is completely compromised. The TNG device provides a dedicated system for user and client system authentication and cryptographic channel management. The TNG jointly establishes a mutually-authenticated cryptographic channel with the TNI. The TNG also can audit all pertinent user activity, providing attribution at the single point-of-entry into each secure infrastructure.

It is appreciated that another form of security attacks are associated with attackers flooding the capacity of a network by the transmission of an abundant amount of communications to the network in the attempt to crash a network or inhibit the performance of a network. Therefore, a high-speed Internet protocol (IP) white-listing firewall that can be configured by an independent preliminary-authentication service can be employed as a preliminary authenticator for entry into a trusted network. The white-listing IP firewall can quickly drop all incoming traffic from sources that aren't explicitly white-listed (i.e. on an explicitly permitted list). The preliminary authentication service can authenticate a user independent of internal services of the trusted network. A secure network can be configured to use a TNI's cryptographic credentials as the qualifying criteria to add that user's IP address to the firewall's white-list. In such a configuration, the firewall permits only IP traffic from valid TNIs to reach internal services. If the preliminary authentication service is attacked, new clients may not be able to become white-listed, while existing white-listed clients can remain white-listed and continue to connect to internal services. In this manner, internal services of the trusted network are hidden from any public network while maintaining full functionality for authenticated users, and unauthenticated users will have all traffic silently dropped by the firewall, as if there was no device present. Monitoring systems within the trusted network can also leverage the white-listing IP firewall to remove misbehaving authenticated clients from the white-list and deny them network access.

Figure 2:
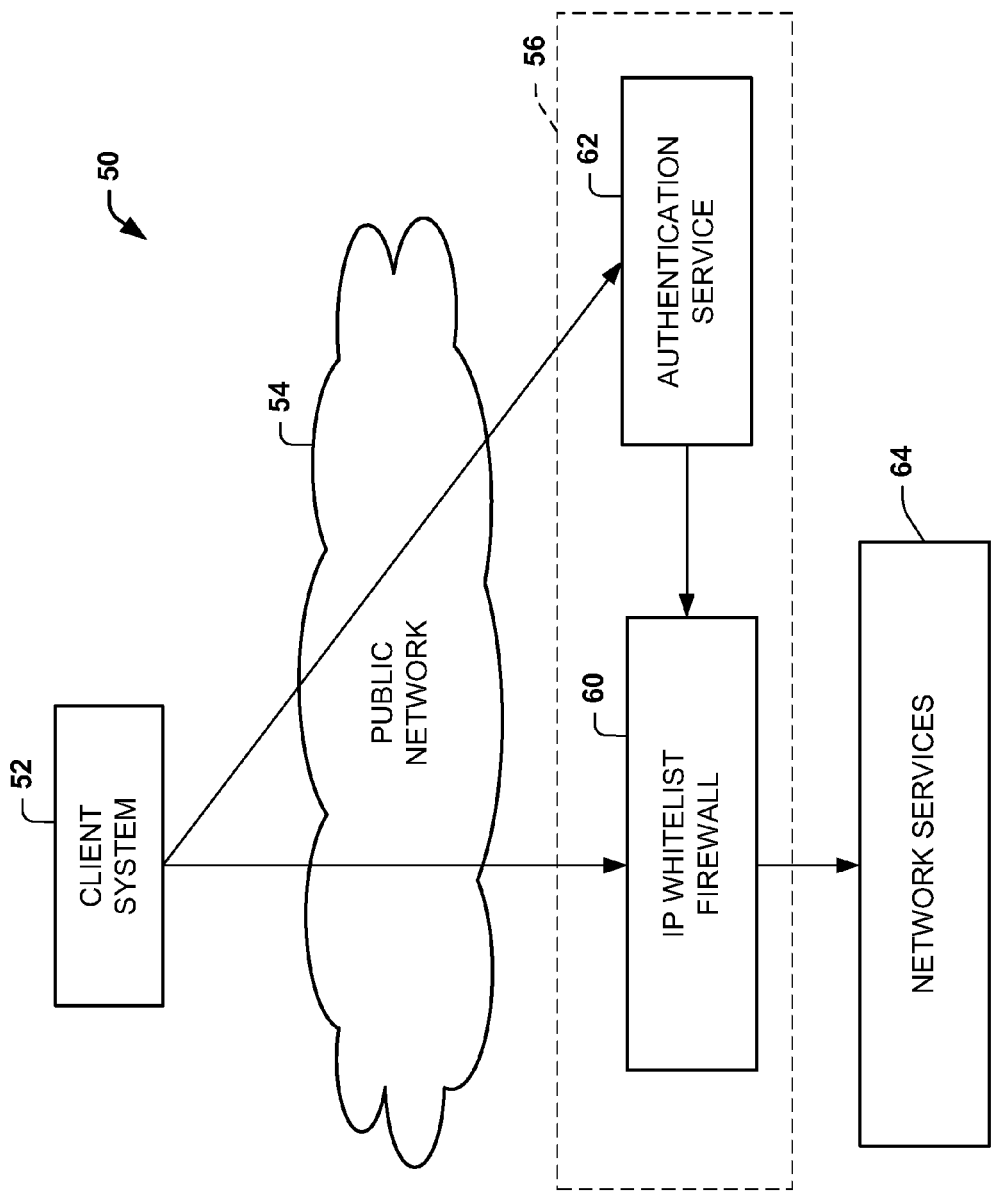
FIG. 2 illustrates a schematic block diagram of a secure network system that employs an exemplary authentication system in accordance with an aspect of the present invention.

FIG. 2 illustrates a secure network system 50 that employs an exemplary authentication system 56 in accordance with an aspect of the present invention. A client system 52 requests communication with a trusted network to access one or more network services 64 through the authentication system 56. Prior to authentication, the client system 52 is not on the IP white-list firewall's 60 white-list, and will be denied access to the network services 64. To gain access, the client system 52 must authenticate with a preliminary authentication service 62. The preliminary authentication service 62 can authenticate a user's credentials (e.g., TNI cryptographic credentials). Upon successful authentication, the preliminary authentication service 62 can add the user's IP address to the firewall's white-list. The firewall 60 now permits IP traffic from the white-listed address to reach internal services 64 of the trusted network. Any communication from an unauthenticated (non-white-listed) user's IP address, will have all its traffic silently dropped by the firewall 60, as if there was no device present.

In another aspect of the invention, the secure network systems and methods provide for the isolation of multiple virtual untrusted systems to specific networks using a trusted hypervisor that couples each system with an independent trusted network interface (TNI) instance provisioned for the secure network that the system is permitted to access. A client system can include one or more independent virtual machine (VM) systems connected through isolated TNI instances managed by a trusted hypervisor coupled to one or more endpoint network systems. Each TNI instance obtains or is provided with keys and credentials to authenticate to its specific network. Each TNI instance is able to establish an encrypted channel between itself and the network to which it has been provisioned. Each VM system can thus establish a separate cryptographically-secure session to an endpoint network through its TNI instance.

Figure 3:
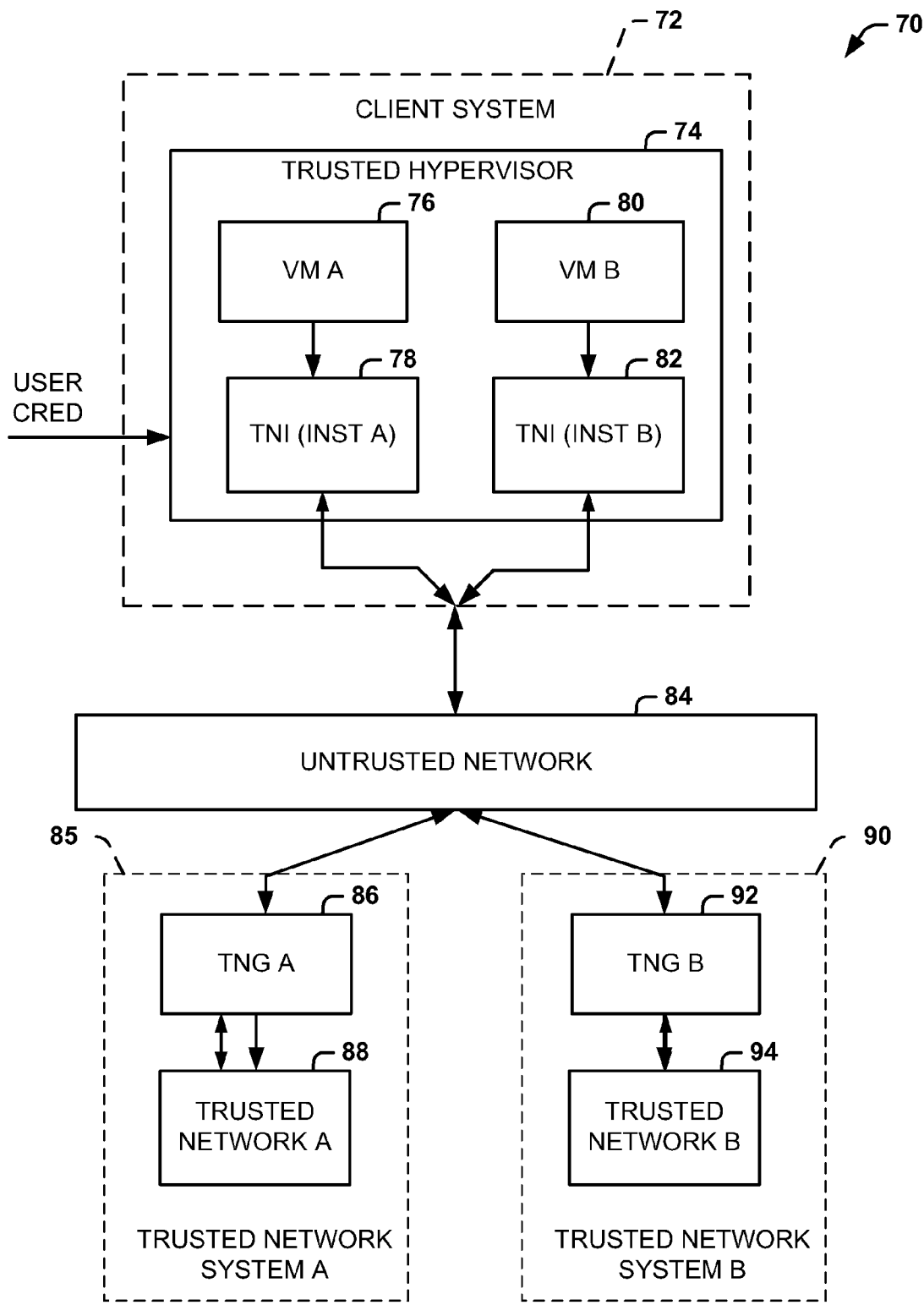
FIG. 3 illustrates a schematic block diagram of a secure network system in accordance with an aspect of the present invention.

FIG. 3 illustrates a secure network system 70 in accordance with an aspect of the present invention. The secure network system 70 includes a trusted hypervisor 74 executing on a client system 72. The trusted hypervisor 74 manages and isolates a first virtual machine system (VM A) 76 and a second virtual machine system (VM B) 80. It is to be appreciated that the trusted hypervisor 74 could manage a plurality of additional VM systems. The first VM system 76 is connected to a first trusted network system (A) 85 through an untrusted network 84 via a first TNI instance (INST A) 78, while the second virtual managed system 80 is connected to a second trusted network system (B) through the untrusted network 84 via a second TNI instance (INST B) 82. Both the first and second TNI instances 78 and 82 can receive a user credential (e.g., smart card) and may be provisioned with one or more encryption/decryption keys. The one or more encryption/decryption keys can be associated with connecting to corresponding that TNI's trusted network system. The user/TNI key pair is provided to a TNG of a given network that the given virtual managed system is connecting.

In the present example, the first TNI instance 78 provides a first user/TNI key pair to a first TNG (A) 86 of the first trusted network system 85. The first TNG 86 authenticates both the user key and TNI key of the first user/TNI key pair. Once authenticated, the first TNG 86 generates and provides the first TNI instance 78 with a unique session key for decrypting and encrypting of the session communications between a first trusted network (A) 88 of the first trusted network system 85 and the first virtual managed system 76. The first TNG 86 can perform extensive logging of session activities and can then associate all session activities with a specific virtual managed system and an associated TNI instance.

Similarly, the second TNI instance 82 provides a second user/TNI key pair to a second TNG (B) 92 of the second trusted network system 90. The second TNG 92 authenticates both the user key and TNI key of the second user/TNI key pair. Once authenticated, the second TNG 92 generates and provides the second TNI instance 82 with a unique session key for decrypting and encrypting of the session communications between a second trusted network (B) 94 of the second trusted network system 90 and the second virtual managed system 80. The second TNG 92 can perform extensive logging of session activities and can then associate all session activities with a specific virtual managed system and an associated TNI instance.

It is to be appreciated that N virtual managed systems can be connected to N different trusted networks employing N TNI instances, where N is an integer greater than or equal to one. Furthermore, M VM systems can be connected to a same trusted network through M TNI instances, where M is an integer greater than or equal to one.

Figure 4:
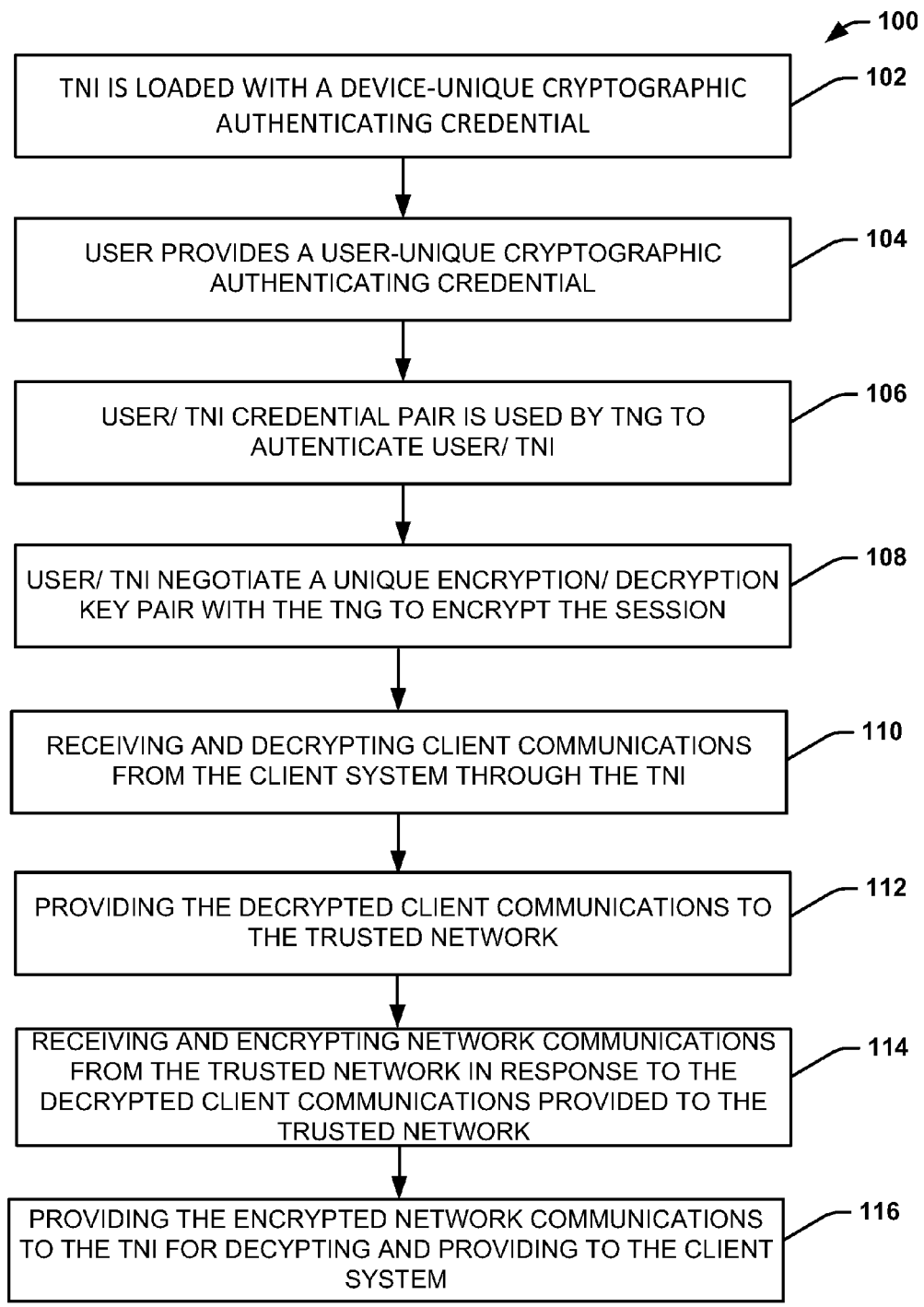
FIG. 4 illustrates a flow diagram of an example of a methodology of providing secure communication between a client system and a trusted network in accordance with an aspect of the present invention.

In view of the foregoing structural and functional features described above, certain methodologies will be better appreciated with reference to FIG. 4. It is to be understood and appreciated that the illustrated actions, in other embodiments, may occur in different orders and/or concurrently with other actions. Moreover, not all illustrated features may be required to implement a methodology.

FIG. 4 illustrates an example of a methodology 100 of providing secure communication between a client system and a trusted network. The methodology 100 is associated with actions of a TNG coupled between the trusted network and a TNI associated with a client system. The methodology 100 begins at 102 where a TNI is provided with a device-unique cryptographic authenticating credential that is coupled to the client system, wherein the TNI cryptographic authenticator (e.g. encryption/decryption key) is associated with a particular TNI. The methodology then proceeds to 104. At 104, the user provides a user-unique cryptographic authenticating credential to the TNI. This credential is used in conjunction with the TNI credential to provide a unique user/TNI authenticator pair. At 106, the user/TNI cryptographic authenticators (e.g. encryption/decryption key pair) are authenticated by the TNG. At 108, the TNG negotiates with the TNI to form unique session key to encrypt/decrypt client communications. At 110, client communications are sent to the secure network by the client system; during this process, they pass through the TNI and become encrypted, pass through any intermediate network infrastructure linking the TNI to the TNG, and are received and decrypted by the TNG. At 112, the decrypted client communications are provided to the trusted network by the TNG on behalf of the transmitting client system. The methodology 100 then proceeds to 114, where network communications generated in response to the received client communications are sent from the trusted network to the client system and, in the process, pass through and become encrypted by the TNG. At 116, the TNG provides the encrypted network communications to the TNI over the connecting network infrastructure, at which point they become decrypted by the TNI and are provided to the client system.

Figure 5:
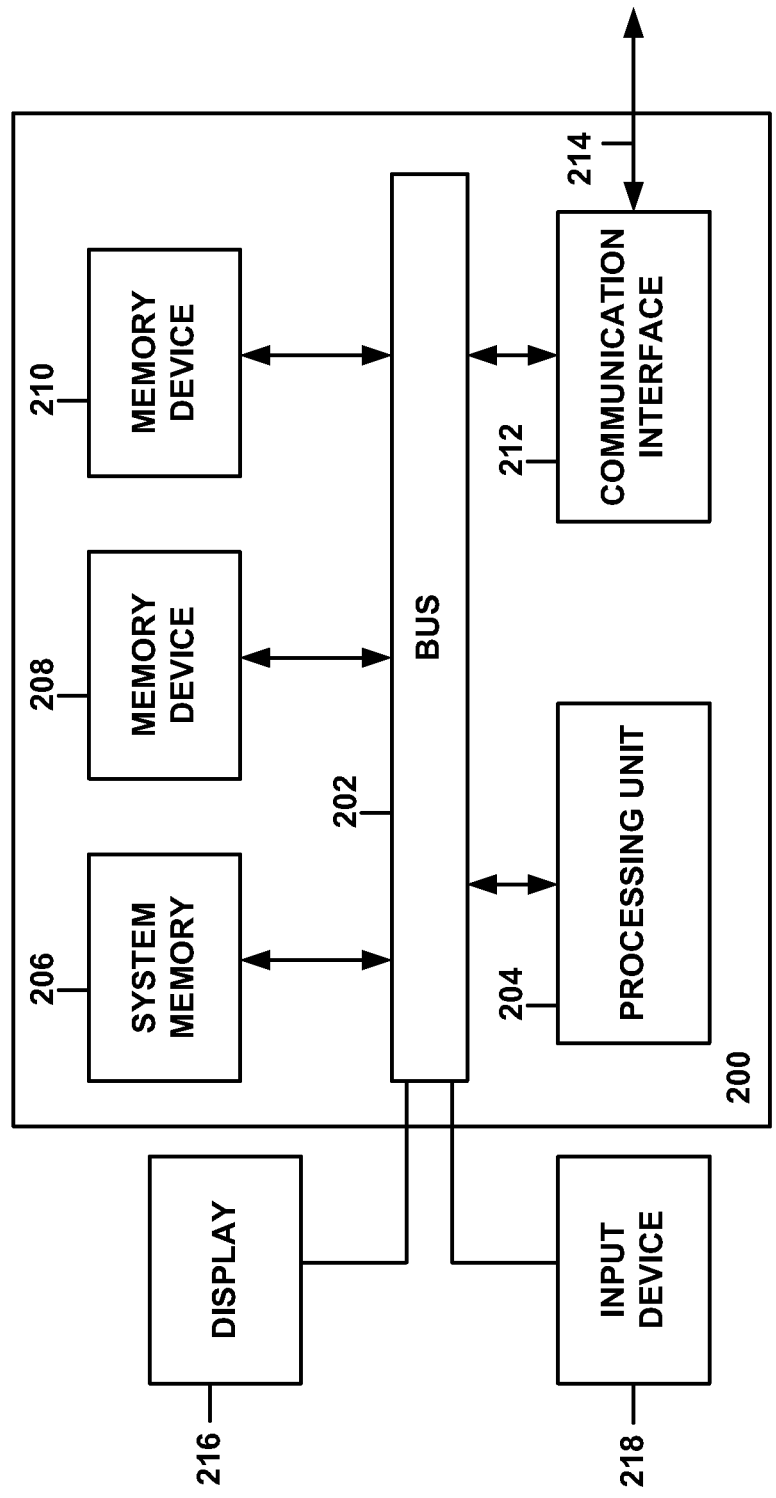
FIG. 5 is a schematic block diagram illustrating an example computing system in accordance with an aspect of the present invention.

FIG. 5 is a schematic block diagram illustrating an example computing system 200 of hardware components such as the hardware components that could be found in computing system 12 or 34 of FIG. 1. The example computing system can also be employed to execute components such as the client system 16 or 36 of FIG. 1, or the client system 52 of FIG. 2 or the client system 72 of FIG. 3. Alternatively, the example computing system can be employed to execute TNG 24 of FIG. 1, or the authentication system 56 or the TNG methodology of FIG. 4. The system 200 can include various systems and subsystems. The system 200 can be a personal computer, a laptop computer, a workstation, a computer system, a virtual machine instance, an application-specific integrated circuit (ASIC), a server, a server blade center, a server farm, a mobile device, such as a smart phone, a personal digital assistant, etc.

The system 200 can include a system bus 202, a processing unit 204, a system memory 206, memory devices 208 and 210, a communication interface 212 (e.g., a TNI or a TNG), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210 are optional, and could be one or more of a hard disk drive, server, stand alone database, or other non-volatile memory, can also be in communication with the system bus 202. For example, the system 200 in the case of computing system 12 or 34 may be a thin client and not include additional memory devices 208 and 210. The system bus 202 operably interconnects the processing unit 204, the memory devices 206-210, the communication interface 212, the display 216, and the input device 218. In some examples, the system bus 202 also operably interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processor core. The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio.

Computer executable logic for implementing the computing system 200 can reside in the system memory 206, and/or in the memory devices 208 and/or 210 in accordance with certain examples. The processing unit 204 executes one or more machine readable instructions originating from the system memory 206 and the memory devices 208 and 210. In such an example, the system memory 206 and/or the memory devices 208 and/or 210 could be employed, for example, to implement the client system 16 or 36 of FIG. 1, or the client system 52 of FIG. 2 or the client system 72 of FIG. 3. Alternatively, the example computing system 200 can be employed to execute TNG 24 of FIG. 1, or the authentication system 56 or the TNG methodology of FIG. 4. The term "computer readable medium" as used herein refers to a medium that participates in providing instructions to the processing unit 204 for execution.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A secure network system comprising:
a computing system comprising:
a client system configured to communicate with a node on a trusted network system; and
a trusted network interface (TNI) coupled to the client system that encrypts and decrypts communication between the client system and the trusted network system, the TNI providing the trusted network system with a cryptographically-secure credential pair authenticating the TNI to the trusted network to initiate a negotiation of an encrypted communication session with the trusted network system, wherein all network traffic of the client system flows through the TNI.

2. The secure network system of claim 1, wherein the TNI receives a unique session cryptographically-secure credential from the trusted network system to employ during the encrypted communication session.

3. The secure network system of claim 1, wherein the encrypted communication between the TNI and the trusted network system passes through an unsecure network.

4. The secure network system of claim 1, wherein the TNI is either a physical hardware peripheral functioning in the role of a network interface controller to a physical system or a virtual peripheral functioning in the role of a network interface controller to a virtual machine.

5. The secure network system of claim 1, further comprising a user credential input device that receives a user credential that includes one or more user cryptographically-secure credentials to be employed by the TNI in negotiating one or more encrypted communication session with one or more trusted network systems.

6. The secure network system of claim 1, further comprising a trusted network system that comprises:
   a trusted network;
   a trusted network gateway (TNG) that encrypts and decrypts communication between the TNI and the trusted network, the TNG comprising:
   an authenticator that receives and authenticates the cryptographically-secure credentials from the TNI; and
   a session manager that negotiates the encrypted communication session with the TNI and provides a unique session cryptographically-secure credential to the TNI to employ during the encrypted communication session.

7. The secure network system of claim 6, the TNG further comprising an activity logger that logs session activities and associates the session activity with the cryptographically-secure credentials used to negotiate the session.

8. The secure network system of claim 6, wherein the authenticator authenticates by looking up the cryptographically-secure credential pair provided by the TNI in a database and adds the user's IP address to a white-listing IP firewall's white-list if it resides in the database to permit IP traffic from the white-listed addresses to reach internal services of the trusted network, the authenticator silently dropping any subsequent communication from unauthenticated user's IP addresses.

9. The secure network system of claim 1, wherein the TNI comprises a plurality of TNI instances that encrypt and decrypt communications between respective virtual client systems and respective trusted network systems.

10. The secure network system of claim 1, wherein the TNI is configured to ensure that all of the network traffic flowing from the client system to the trusted network is encrypted by the TNI.

11. The secure network system of claim 1, wherein the TNI is configured to ensure that all of the network traffic flowing from the client system is decrypted by the TNI.

12. The secure network system of claim 1, wherein the TNI provides the only network access point for the computing system.

13. A secure network system comprising:
   a computing system comprising:
      a client system configured to communicate with a node on a trusted network system;
      a trusted network interface (TNI) coupled to the client system that provides a trusted network system with a user/TNI encryption/decryption key pair that includes a key associated with a user of the client system and a key associated with the TNI, wherein all network traffic of the client system flows through the TNI; and
   a trusted network system comprising:
      a trusted network; and
      a trusted network gateway (TNG) that receives the user/TNI encryption/decryption key pair and negotiates and establishes an encrypted communication session between the client through the TNI and the trusted network through the TNG.

14. The secure network system of claim 13, wherein the TNG provides the TNI with a unique session key to employ during the encrypted communication session.

15. The secure network system of claim 13, wherein the TNI is either a physical hardware peripheral functioning in the role of a network interface controller to a physical system or a virtual peripheral functioning in the role of a network interface controller to a virtual machine.

16. The secure network system of claim 13, further comprising a user credential input device that receives a user credential that includes one or more user encryption keys to be employed by the TNI in negotiating one or more encrypted communication session with one or more trusted network systems.

17. The secure network system of claim 13, wherein the TNG comprises:
   an authenticator that receives and authenticates the user/TNI encryption/decryption key pair from the TNI;
   a session manager that negotiates the encrypted communication session with the TNI and provides the unique session key to the TNI to employ during the encrypted communication session; and
   an activity logger that logs session activities and associates the session activity with a user and a TNI associated with the user/TNI key encryption/decryption key pair.

18. The secure network system of claim 17, wherein the authenticator authenticates by looking up the IP address provided by the TNI in a database and adds the user's IP address to a white-listing IP firewall's white-list if it resides in the database to permit IP traffic from the white-listed addresses and/or user/TNI key pair to reach internal services of the trusted network, the authenticator silently dropping any subsequent communication from unauthenticated user's IP addresses.

19. The secure network system of claim 13, wherein the TNI comprises a plurality of TNI instances that encrypt and decrypt communications between respective virtual client systems and respective trusted network systems.

20. A method of providing secure communication between a client system and a node on a trusted network, the method comprising:
   receiving a user/TNI encryption/decryption key pair from a trusted network interface (TNI) that is coupled to the client system, wherein the user/TNI encryption/decryption key pair includes a key associated with a user of the client system and a key associated with the TNI;
   authenticating the user/TNI encryption/decryption key pair;
   providing the TNI with a unique session key to encrypt client communications;
   receiving and decrypting encrypted client communications from the client system through the TNI; and
   providing the decrypted client communications to the trusted network, wherein all network traffic of the client system flows through the TNI.

21. The method of claim 20, further comprising:
   receiving and encrypting network communications destined to the TNI from the trusted network; and
   providing the encrypted network communications from the trusted network to the TNI for decrypting and providing to the client system.

22. The method of claim 21, further comprising logging session activities associated with the client communications and/or network communications and associating the session activity with the user and the TNI associated with the user/TNI key encryption/decryption key pair.

23. A method of providing secure communication between a client system and a trusted network, the method comprising:
   receiving a user/TNI encryption/decryption key pair from a trusted network interface (TNI) that is coupled to the client system, wherein the user/TNI encryption/decryption key pair includes a key associated with a user of the client system and a key associated with the TNI;
authenticating the user/TNI encryption/decryption key pair;
wherein the authenticating comprises:
  looking up the IP address of the device associated with the TNI in a database;
  adding the user's IP address to a firewall's white-list if it resides in the database to permit IP traffic from the white-listed addresses to reach internal services of the trusted network; and
  silently dropping any subsequent communication from unauthenticated user's IP address;
providing the TNI with a unique session key to encrypt client communications;
receiving an decrypting encrypted client communications from the client system through the TNI; and
providing the decrypted client communications to the trusted network.

* * * * *